US006839244B1

(12) United States Patent
Rood

(10) Patent No.: US 6,839,244 B1
(45) Date of Patent: Jan. 4, 2005

(54) WIRE RETAINER AND HOLDING DEVICE

(76) Inventor: Richard K. Rood, 207 Cimarron Village La., Henderson, NV (US) 89012

( * ) Notice: Subject to any disclaimer, the term of this patent is extended or adjusted under 35 U.S.C. 154(b) by 0 days.

(21) Appl. No.: 10/157,429

(22) Filed: May 28, 2002

Related U.S. Application Data

(60) Provisional application No. 60/294,123, filed on May 29, 2001.

(51) Int. Cl.⁷ .................................................. H02B 1/26
(52) U.S. Cl. ......................................... 361/826; 174/58
(58) Field of Search ........................... 361/826; 174/54, 174/55, 58, 53

(56) References Cited

U.S. PATENT DOCUMENTS

| | | | | |
|---|---|---|---|---|
| 3,495,276 A | * | 2/1970 | Suess ........................... | 52/270 |
| 5,397,093 A | * | 3/1995 | Chubb et al. ................ | 248/544 |
| 5,444,183 A | * | 8/1995 | Gehrs et al. ............... | 174/65 R |
| 6,031,181 A | * | 2/2000 | Jacks ........................... | 174/58 |
| 6,437,241 B1 | * | 8/2002 | Neujahr ....................... | 174/58 |
| 6,660,936 B1 | * | 12/2003 | Jacks ........................... | 174/58 |

* cited by examiner

Primary Examiner—David Martin
Assistant Examiner—Dameon E. Levi
(74) Attorney, Agent, or Firm—Gregory J. Nelson

(57) ABSTRACT

A retainer for securing wires in a locatable position in a ceiling or wall structure after the structure has been shut in. The retainer has a mounting surface with terminals to which the wires are attached. The terminals are each connected to conductive path so that a signal applied to the opposite ends of the wire can be sensed by a tone generator. The retainer has wins or tabs securable to the framing members prior to being walled-in. A magnetic locator on the mounting surface allows a technician to accurately locate a center point for cutting an opening to receive a device such as a sound system speaker.

7 Claims, 2 Drawing Sheets

WIRE RETAINER AND HOLDING DEVICE

This application is based on Provisional Ser. No. 60/294,123, filed May 29, 2001, entitled "Wire Retainer and Holding Device."

FIELD OF THE INVENTION

The present invention relates to a retaining device and more particularly to a device to which wires may be attached for conveniently locating the wires after they have been closed in by construction.

BACKGROUND OF THE INVENTION

It is conventional practice in construction to pre-wire a structure once framing is completed. The pre-wiring of security systems, speaker wires for home entertainment centers and various communication wires such as telephone wiring and other cabling is a common practice. Generally these wires are placed in ceilings and walls after framing and secured in place by staples or other fasteners. A section of the wire is coiled at the terminus as for example, at the location in which a speaker is to be placed. Construction proceeds and wallboard or sheeting is placed over the framing. When it becomes necessary to attach a device such as a speaker to the wire terminus, several methods are employed. Once method is to pre-measure the approximate location of the wire. When the wall is shut in, the technicians measure to find the approximate location and cut into the wall at that point for the installation of a device such as a speaker. This procedure takes considerable time and is not always accurate and may result in the necessity for subsequent patching work.

Another procedure is the for the technician to connect the exposed opposite ends of the wire to a signal-generating device, sometimes called a tone sender. The technician will then go to the approximate location where the wires are located within the wall and use a locating device such as an inductive amplifier. The inductive amplifier will be receptive to a tone or signal passed through the wire. In this way, the technician can approximately locate the ends of the wires with more accuracy than rough measuring. However, this procedure is not entirely accurate and sometimes necessitates several cuts having to be made and patching may be required. Further, this method of locating wires does not provide the technician with the location of the wall studs. Thus, it may be necessary for the technician to also use a stud a finder once the wires are located to make sure the technician does not cut into the studs and that the opening for the device, such as a speaker, is properly located with respect to the studs.

BRIEF SUMMARY OF THE INVENTION

Briefly, the present invention provides a wire retaining device which allows a technician to precisely locate walled-in wires and, at the same time, locate a center point between adjacent studs which center point will be used as a reference point for cutting an opening such as a circular opening for a speaker or other device.

The present invention removes the guess work involved in searching for cables and wires and significantly reduces the time and increases the accuracy of work of this type performed by custom installers.

The present invention provides a retainer of inexpensive, rigid material such as cardboard or plastic. The retainer is provided the user in a generally planar condition and is generally rectangular. The opposite ends of the retainer are provided with a number of spaced-apart parallel perforations so the retainer can be formed into a general U-shape of varying length. The intermediate section of the retainer provides a mounting surface on which are attached at least two concentric loops of conductive material. The loops may be a foil or other material adhesively secured or embossed to the surface of the bracket. The loops each have an arm section extending to a wire connector which may be a screw or simply a terminal post which is also conductive. A magnetic material is secured to the mounting surface at the center of the loops.

In use, the retainer is bent into a general U-shape by bending the opposite ends at the bendable score lines or perforations. The retainer can be inserted into a position between parallel members such as wall studs or ceiling rafters. The opposite ends of the "U" form wings which are then fastened by stapling or other fasteners to the studs with the mounting surface positioned slightly inward of the face of the studs or rafters to which wallboard or other material will be subsequently attached.

The retainer is placed at a location where a device such as a speaker will be subsequently installed. The wires are routed prior to closure within the framing and connected to the terminals. In the case of speakers wires, one wire would be connected to one of the wire terminals and the other wire connected to the second terminal. When the installer is ready to install a device, the installer will apply a tone or signal to the opposite, exposed ends of the wire. The installer will then use a device such as an inductive amplifier to precisely locate the device as the signal will be transmitted through the wires, terminals and to the conductive loops. Once having found the location, the installer can then use a magnetic device to locate the precise center location between the studs. Using this point as a reference point, the installer may then cut an opening through the wallboard, for example forming a circle cutout for a speaker. The cutout will also cut through the mounting surface of the bracket to allow the installer easy access to the wires connected to the wire terminals. These wires can be pulled and connected to a device such as a speaker.

BRIEF DESCRIPTION OF THE DRAWINGS

The above and other objects and advantages will become more apparent from the following description, claims and drawings in which:

DETAILED DESCRIPTION OF THE DRAWINGS

Figure 1:
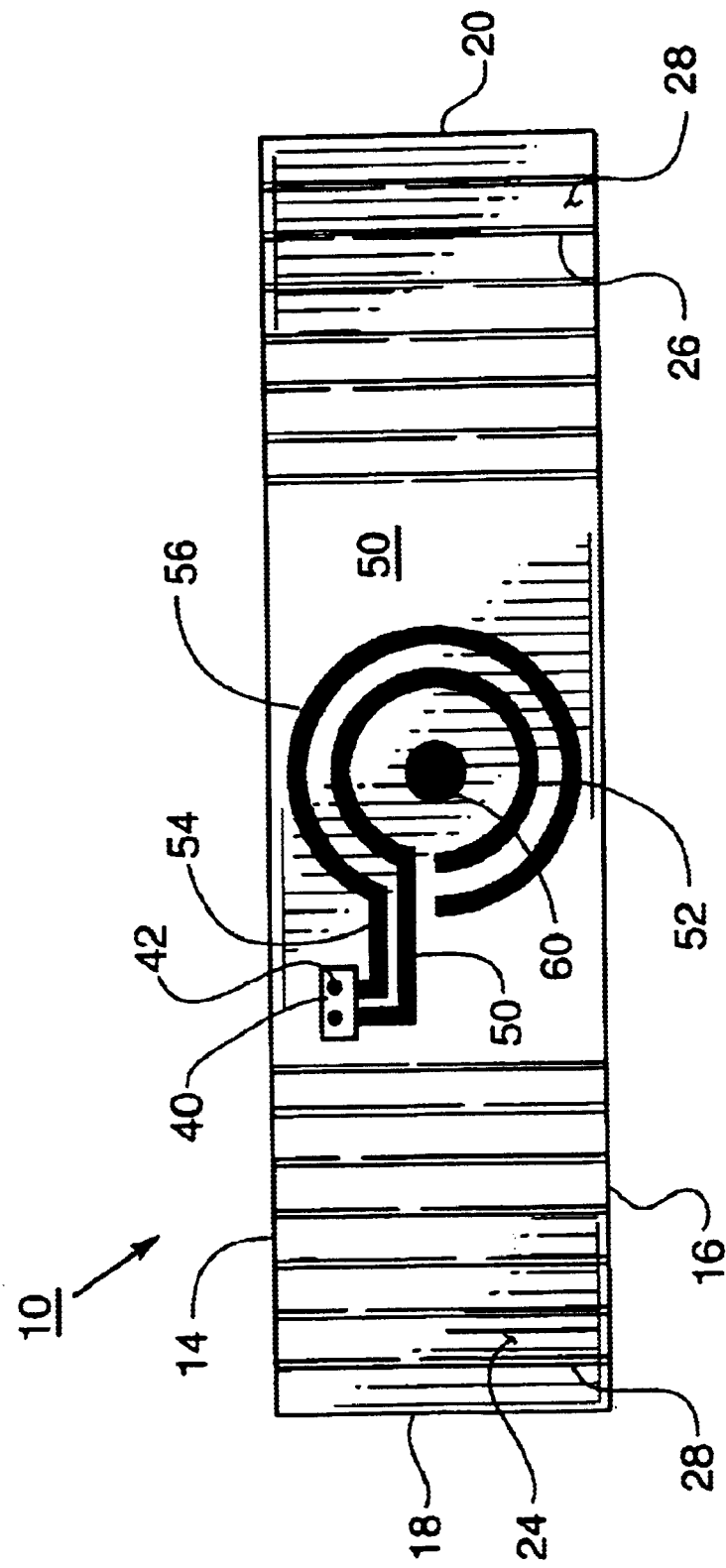
FIG. 1 is a plan view of the wire retainer of the present invention in a planar condition as it is provided to installer.

Turning now to the drawings, the retainer of the present invention is generally designated by the numeral 10 and includes a mounting member 12 which is shown as being generally rectangular having opposite edges 14 and 16 and opposite ends 18 and 20. The mounting member 12 is fabricated from a suitable material such as cardboard or light-weight plastic. The mounting member 12 provided with opposite end tab on wing sections 24 and 26. The end sections 24 and 26 are each provided with a plurality of score lines 28 which are score lines or perforations 28 are spaced-apart. An intermediate section of the member 12 defines a mounting surface 30. The mounting surface 30 is provided with a pair of wire terminals or connectors 40 and 42 which are either posts or may include screws to secure the wires. The wire terminal 40 is connected to conductive loop 50 which has a generally circular end section 52. Note the circular end section 52 does not constitute an entire circle. Similarly, terminal 42 is connected to wire loop 54 which has a circular section 56 concentric with section 52. At the center, defined by the loops 52 and 56, a circular section 60 of magnetic material is provided on the surface of the mounting section. The loops 54 and 56, as well as a circular section 60, are all of a conductive material such as a metal that may be adhesively secured to the surface or embossed or otherwise applied to the surface.

It will be apparent to those skilled in the art that the retainer may be any size and the shape may vary depending on both the installation environment and the configuration of the device to be installed.

Figure 2:
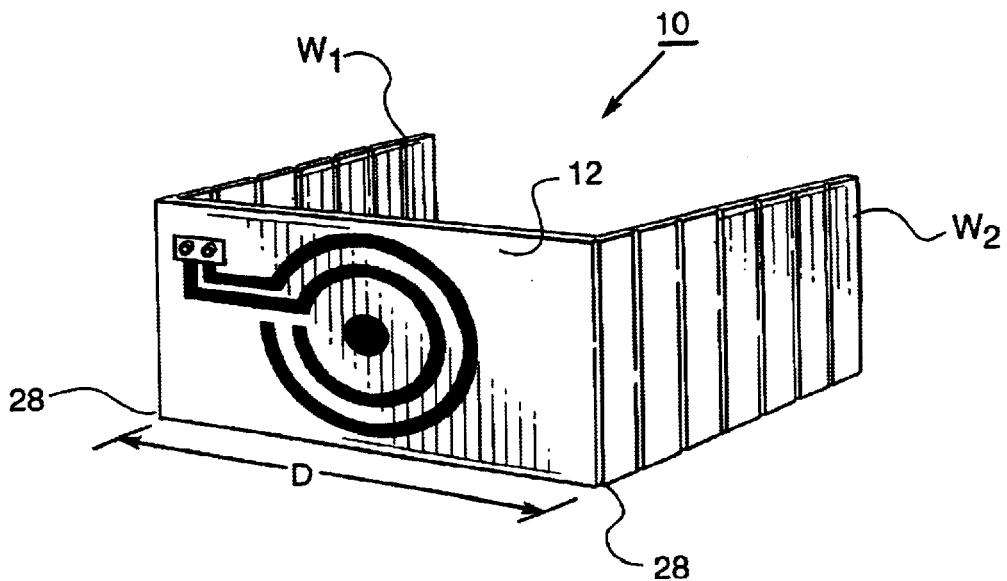
FIG. 2 shows the retainer formed into a general "U" shape.
Figure 3:
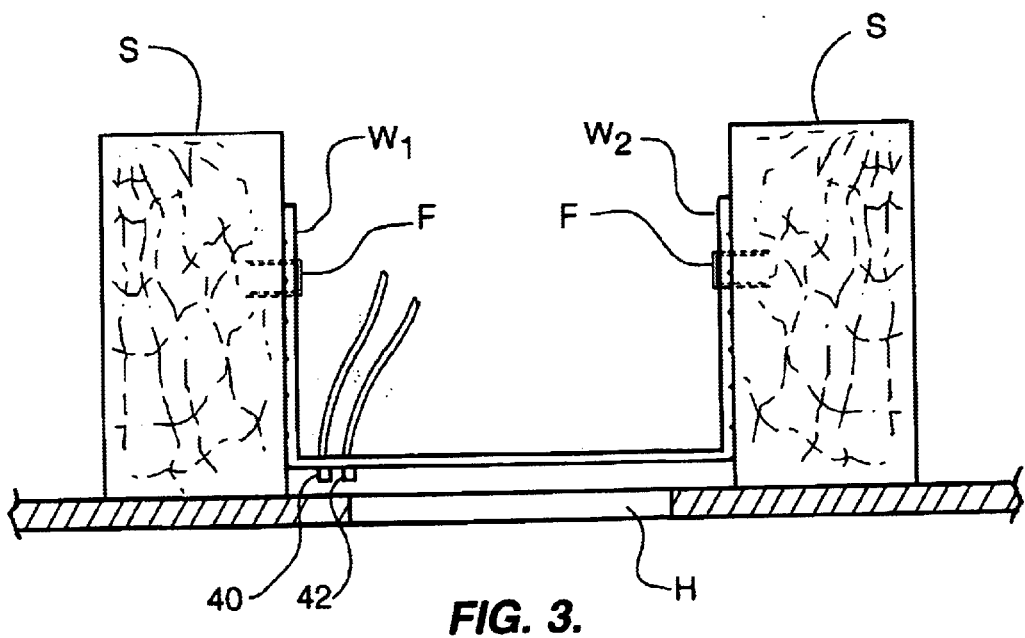
FIG. 3 shows the retainer device positioned in a wall after the wallboard has been cutaway.

In use, the installer would be provided a retainer as shown in FIG. 1. The installer will determine the spacing between adjacent structural member such as walls or studs. Typically, wall framing is either on 12", 16" or 24" centers. The installer will then form the planar section into a general U-shape bending the opposite ends to form wings W1 and W2 at selected perforated or scored locations 28 so the distance D, as seen in FIG. 2 conforms to the spacing between the studs S. The installer will then position the retainer at the location at which a device such as a speaker may be subsequently located. The retainer is installed by positioning between the adjacent structural members S securing the wings with a fastener F, such as a staple, to the surfaces of the rafter or studs. The mounting surface 30 will be disposed slightly inwardly of the exposed outer surface of the structural members to which wallboard or other finishing sheet material will be subsequently applied. The installer will repeat this for all locations where a device is to be subsequently installed.

Once the structure has been walled-in, the installer can then return and use a tone generator such as the type manufactured by Crescent Electronics or Ideal Electronics. The device is attached to the exposed opposite ends of the wire 40, 42. The installer can then go to the approximate location using a device such as an inductive amplifier, locate precisely the location of the retainer as a signal will be transmitted by the wires and the conductive loops 50 and 56. Having located the wires, the installer can then use a magnetic device to find the precise center location between the adjacent studs. Once this location is found and is marked and the installer may use a cutter such as a circular cutter to cut away the wallboard at H which will, because of the close proximity of the bracket behind it, also cut away the retainer leaving the wires 40 and 42 which are connected to the wire connectors or terminals. The hole cut will be a size to accommodate the device to be installed such as a speaker.

The wires 40 and 42 are readily accessible through the hole and may be pulled and connected to the speaker and the speaker secured in place either to the wallboard and/or rafters in a conventional manner.

The device of the present invention allows an installer to easily locate pre-wired wires and cables. The wires are connected to the terminals so they remain out of contact and will create a perfect field for a tone to be received to allow the location to be easily identified by an inductive probe. The design also insures the wires do not short out making toning easier.

The metal disc in the center is positioned exactly where the center of the device will be after construction. The retainer of the present invention eliminates the guess work in searching for cables and device location substantially reducing the installation time required on the part of the technician and further reducing errors, inaccuracies and subsequent patch work.

It will be obvious to those skilled in the art to make various changes, alterations and modifications to the invention described herein. To the extent these various changes, alterations and modifications do not depart from the spirit and scope of the appended claims, they are intended to be encompassed therein.

I claim:

1. A retainer device for temporarily securing wires in a locatable position in an enclosed structure comprising:
    (a) a body having a mounting surface and attachment means for securing said body to said structure;
    (b) at least one wire terminal on said mounting surface for temporary attachment of a wire;
    (c) a magnetic member located on said body; and
    (d) an electrically conductive pathway extending along said mounting surface whereby the said wire can be located by applying a tone to the said wire which is transmitted along the pathway to provide a locatable signal.

2. The retainer device of claim 1 wherein said attachment means comprise bendable sections adjacent said mounting section.

3. The retainer device of claim 1 wherein said retainer is a light weight, generally planar material.

4. The retainer device of claim 1 wherein said conductive pathways are concentric to one another.

5. The retainer device of claim 2 wherein said retainer is generally rectangular.

6. The retainer device of claim 4 wherein a magnetic member is centrally positioned with respect to said concentric pathways.

7. The device of claim 1 wherein said at least one wire terminal comprises a pair of terminals each connected to a separate conductive path.

* * * * *